US009109529B2

(12) United States Patent
Kashiyama

(10) Patent No.: US 9,109,529 B2
(45) Date of Patent: Aug. 18, 2015

(54) FUEL SUPPLYING CONTROLLER

(71) Applicant: DENSO CORPORATION, Kariya, Aichi-pref. (JP)

(72) Inventor: Hiromu Kashiyama, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/332,715

(22) Filed: Jul. 16, 2014

(65) Prior Publication Data

US 2015/0025773 A1 Jan. 22, 2015

(30) Foreign Application Priority Data

Jul. 18, 2013 (JP) ................................ 2013-149505

(51) Int. Cl.

*F02D 41/22* (2006.01)
*F02M 37/22* (2006.01)
*F02M 37/00* (2006.01)
*G01M 15/00* (2006.01)

(52) U.S. Cl.

CPC ............ *F02D 41/22* (2013.01); *F02M 37/007* (2013.01); *F02D 2041/224* (2013.01)

(58) Field of Classification Search

CPC ... F02D 41/00; F02D 41/22; F02D 2041/224; F02M 25/00; F02M 25/07; F02M 37/00; F02M 37/22; F02M 37/007; G01M 15/00

See application file for complete search history.

(56) References Cited

U.S. PATENT DOCUMENTS 6,672,147 B1 * 1/2004 Mazet ........................ 73/114.43
2009/0277424 A1 11/2009 Yonemoto et al.

FOREIGN PATENT DOCUMENTS

| | | | | |
|---|---|---|---|---|
| EP | 1 319 821 | | 6/2003 | |
| JP | 6-185394 | | 7/1994 | |
| JP | 7-158497 | | 6/1995 | |
| JP | 2005-273535 | | 10/2005 | |
| JP | 2008014215 | A * | 1/2008 | ............. F02D 41/06 |
| JP | 2009-138649 | | 6/2009 | |
| JP | 2011-231659 | | 11/2011 | |

OTHER PUBLICATIONS

U.S. Appl. No. 14/332,706, filed Jul. 16, 2014.

* cited by examiner

*Primary Examiner* — Hieu T Vo
(74) *Attorney, Agent, or Firm* — Nixon & Vanderhye PC

(57) ABSTRACT

A fuel supplying controller detecting a clogging of a fuel filter includes a period setting portion setting a non-detection period where a clogging detection is prohibited, an ambient-temperature detection portion detecting an ambient temperature of an exterior of a vehicle, and a residual-fuel detection portion detecting a residual-fuel quantity in a fuel tank. The period setting portion sets the non-detection period, based on the ambient temperature detected by the ambient-temperature detection portion and the residual-fuel quantity detected by the residual-fuel detection portion.

6 Claims, 3 Drawing Sheets

FUEL SUPPLYING CONTROLLER

CROSS REFERENCE TO RELATED APPLICATION

This application is based on Japanese Patent Application No. 2013-149505 filed on Jul. 18, 2013, the disclosure of which is incorporated herein by reference.

TECHNICAL FIELD

The present disclosure relates to a fuel supplying controller provided with a fuel filter.

BACKGROUND

Conventionally, a fuel supplying controller includes a fuel tank accommodating fuel, a supply pump drawing the fuel from the fuel tank and supplying the fuel to an internal combustion engine, and a fuel filter provided in a passage between the fuel tank and the supply pump to remove foreign matters in the fuel.

In the fuel supply controller, foreign matters of the fuel drawn from the fuel tank are removed by the fuel filter. Therefore, the fuel filter is clogged, and the fuel is improperly supplied to the supply pump from the fuel tank. The fuel supply controller is provided with a clogging detection portion detecting a clogging of the fuel tank. When the fuel filter is clogged by the foreign matters, the clogging detection portion detects the clogging of the fuel tank by measuring a fuel pressure of the fuel drawn by the supply pump. Further, a driver is noticed by a warning portion that the fuel filter is clogged, and then exchanges the fuel filter.

It is known that a viscosity of fossil fuel used in the internal combustion engine varies according to the fuel temperature. For example, gas oil (light oil) used in a diesel engine varies according to the fuel temperature. When the fuel temperature becomes lower, the viscosity of the fuel becomes higher. In other words, the high-viscosity change of the fuel is generated. When the fuel having high viscosity flows through the fuel filter, a pressure loss of the fuel becomes larger according to the fuel filter. A pressure of the fuel drawn by the supply pump is lowered by the pressure loss. Thus, the clogging detection portion may erroneously determine that the fuel filter is clogged due to the pressure loss, even though no foreign matter clogs at the fuel filter.

JP-2005-273535A discloses a clogging detection portion of a fuel supplying controller previously sets a non-detection period where a clogging detection is prohibited at a predetermined time period. An elapsed period is counted by a timer counter which adds at a predetermined period. When the timer counter exceeds the non-detection period, the clogging detection is started. Even when a temperature sensor provided between the fuel tank and the supply pump to detect the fuel temperature is canceled, the increase in fuel temperature can be measured, and the clogging detection can be prohibited in a case where the high-viscosity change of the fuel is generated. Since the clogging detection is executed after the high-viscosity change of the fuel is canceled, an erroneous determination can be prevented.

Since the fuel is accommodated in the fuel tank provided at a position separating from the internal combustion engine, the fuel temperature of the fuel tank is readily affected by an ambient temperature. Therefore, an increasing rate of the fuel temperature is affected by a specified vehicle-state value of the internal combustion engine and an outer environment.

According to JP-2005-273535A, since the non-detection period is only set based on the specified vehicle-state value such as a vehicle speed or an engine speed, it is possible that the increasing rate of the fuel temperature is erroneously measured. In this case, the clogging detection portion may not start the clogging detection even though the high-viscosity change of the fuel is actually canceled, or the clogging detection portion may start the clogging detection even though the high-viscosity change of the fuel is generated. Therefore, the clogging detection portion cannot guarantee the reliability of the clogging detection.

SUMMARY

It is an object of the present disclosure to provide a fuel supplying controller which improves a reliability of a clogging detection.

According to an aspect of the present disclosure, the fuel supplying controller includes a fuel tank, a supply pump, a fuel filter, a clogging detection portion, a period setting portion, a timer count portion, an ambient-temperature detection portion, and a residual-fuel detection portion. The fuel tank accommodates a fuel. The supply pump supplies the fuel from the fuel tank to an internal combustion engine of a vehicle. The fuel filter is provided in a passage between the fuel tank and the supply pump, and filters the fuel. The clogging detection portion detects a clogging of the fuel filter. The period setting portion sets a non-detection period where a clogging detection according to the clogging detection portion is prohibited. The timer count portion measures a period from a start of the internal combustion engine to a time point that a timer counter exceeds the non-detection period. The ambient-temperature detection portion detects an ambient temperature of an exterior of the vehicle. The residual-fuel detection portion detects a residual-fuel quantity in the fuel tank. The period setting portion sets the non-detection period, based on the ambient temperature detected by the ambient-temperature detection portion and the residual-fuel quantity detected by the residual-fuel detection portion.

Since the fuel is accommodated in the fuel tank, when the ambient temperature of the exterior of the vehicle is low, a temperature in the fuel tank is decreased according to the ambient temperature, and the fuel temperature is also decreased. That is, the fuel temperature in the fuel tank can be measured from the ambient temperature. The fuel temperature can be increased by heat transmitting to the fuel from a combustion of the internal combustion engine. A period for a high-viscosity change of the fuel to be canceled in case where the fuel temperature is low is longer than that in a case where the fuel temperature is high. Since a start temperature of the fuel is different, when the ambient temperature is low, the heat transmitted from the combustion is necessary to be more than assumed. When a count is executed by the timer count portion after the non-detection period is set without respect to the ambient temperature, the period for the high-viscosity change of the fuel to be canceled may be retarded.

According to the present embodiment, since the non-detection period is set based on the ambient temperature of the exterior of the vehicle, the non-detection period is a value indicating the heat and the period which are necessary for the high-viscosity change of the fuel to be canceled. Therefore, the increase in fuel temperature can be accurately measured, and a reliability of the clogging detection can be improved.

An increasing rate of the fuel temperature varies according to the residual-fuel quantity in the fuel tank. That is, when the residual-fuel quantity is large, since a mass of the fuel to which the heat is transmitted from the internal combustion engine is large, it is difficult for the fuel temperature to be increased. When the residual-fuel quantity is large, the period for the high-viscosity change of the fuel to be canceled may become longer. When the residual-fuel quantity is small, the period for the high-viscosity change of the fuel to be canceled may become shorter.

According to the present embodiment, since the non-detection period is set based on the residual-fuel quantity detected by the residual-fuel detection portion, the non-detection period is a value indicating the heat which is necessary for the fuel according to the mass when the fuel temperature is increased. Therefore, the increase in fuel temperature can be accurately measured, and the reliability of the clogging detection can be improved.

According to the present disclosure, the increase in fuel temperature can be accurately measured without directly detecting the fuel temperature, and is can be accurately determined whether the high-viscosity change of the fuel is canceled. Therefore, the reliability of the clogging detection can be improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
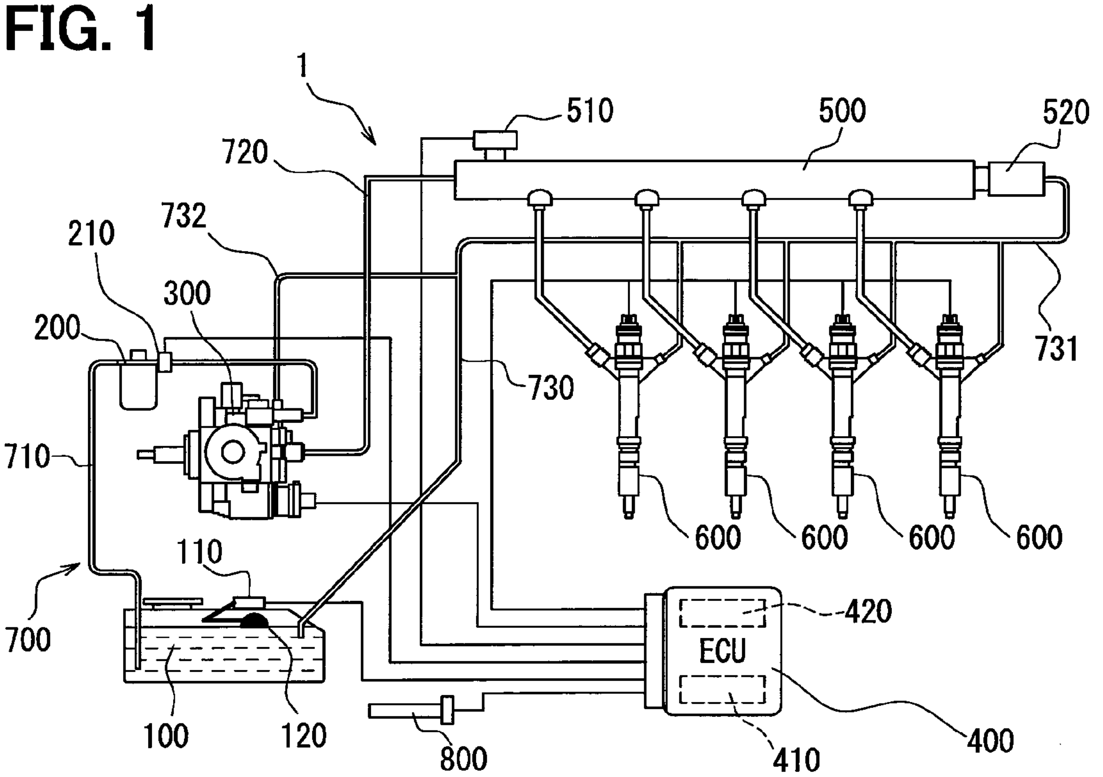
FIG. 1 is a diagram showing an outline of a fuel supplying controller according to an embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, referring to drawings, an embodiment of the present disclosure will be described. The substantially same parts or components as those in the embodiments are indicated with the same reference numerals and the same descriptions may be omitted. Further, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

Embodiment

As shown in FIG. 1, a fuel supplying controller 1 according to an embodiment of the present disclosure includes a fuel tank 100, a supply pump 300, a fuel filter 200, a common rail 500, injectors 600, an outer temperature sensor 800, and an electric control unit (ECU) 400.

The fuel tank 100 corresponds to a container which accommodates fuel supplied to an internal combustion engine. The fuel tank 100 is connected to the supply pump 300 via a pipe 700 corresponding to a passage through which fuel flows. The fuel accommodated in the fuel tank 100 is drawn by the supply pump 300. Further, a main return fuel corresponding to a surplus fuel in each injector 600 of the internal combustion engine and the common rail 500 of the internal combustion engine, and a pump return fuel corresponding to a surplus fuel in the supply pump 300, are returned to the fuel tank 100 via the pipe 700 as a return fuel.

The fuel tank 100 is provided with a residual-fuel meter 110. The residual-fuel meter 110 is connected to a float 120 floating on the fuel in the fuel tank 100. The residual-fuel meter 110 detects a residual-fuel quantity in the fuel tank 100 by measuring a liquid level of the fuel using the float 120. The residual-fuel meter 110 is electrically connected with the ECU 400, and sends the residual-fuel quantity to the ECU 400. The residual-fuel meter 110 corresponds to a residual-fuel detection portion.

The pipe 700 includes a low-pressure pipe 710, a high-pressure pipe 720, and a return pipe 730. The low-pressure pipe 710 corresponding to a passage is provided between the fuel tank 100 and the supply pump 300. The high-pressure pipe 720 corresponding to a passage is provided between the supply pump 300 and the common rail 500. The return pipe 730 corresponding to a passage is provided between the internal combustion engine, the supply pump 300, and the fuel tank 100. The return pipe 730 includes a main return pipe 731 and a pump return pipe 732. The main return pipe 731 corresponds to a passage through which the main return fuel is returned to the fuel tank 100. The pump return pipe 732 corresponds to a passage through which the pump return fuel is returned to the fuel tank 100. The return pipe 730 returns the return fuel to the fuel tank 100 via the main return pipe 731 and the pump return pipe 732.

The fuel filter 200 is provided in the low-pressure pipe 710 between the fuel tank 100 and the supply pump 300. The fuel filter 200 removes foreign matter included in the fuel by filtering the fuel. The fuel filter 200 includes a clogging switch portion 210 electrically connected with the ECU 400 at an outlet portion of the fuel filter 200.

The clogging switch portion 210 includes an elastic member which deforms at a predetermined pressure, a switch member which is pressed by an elastic force of the elastic member, and a contact member which is in contact with the switch member in a case where the switch member pressed by the elastic member. When the switch member is in contact with the contact member, the clogging switch portion 210 sends an on signal to the ECU 400. When the switch member is not in contact with the contact member, the clogging switch portion 210 sends an off signal to the ECU 400. In a normal state of the clogging switch portion 210, the elastic member presses the switch member, and the switch member is in contact with the contact member. That is, the clogging switch portion 210 sends the on signal to the ECU 400 in the normal state. When a fuel pressure at the outlet portion of the fuel filter 200 becomes less than or equal to the predetermined pressure due to a clogging of the fuel filter 200, the switch member is separated from the contact member.

Specifically, since a pressure between the supply pump 300 and the fuel filter 200 becomes a negative pressure, the switch member is separated from the contact member toward the pipe 700 by the elastic member. Therefore, the clogging switch portion 210 sends the off signal to the ECU 400. That is, the clogging switch portion 210 has a structure of a normally close type. Specifically, the clogging switch portion 210 usually sends the on signal. However, when the fuel filter 200 is clogged such that the fuel pressure becomes lower, the clogging switch portion 210 sends the off signal. The ECU 400 detects the clogging of the fuel filter 200 by receiving the off signal from the clogging switch portion 210. The clogging switch portion 210 and the ECU 400 correspond to a clogging detection portion.

The injector 600 is cylindrical-shaped and is provided in a cylinder of the internal combustion engine. The injector 600 is connected to the common rail 500. The fuel is supplied from the common rail 500 to the injector 600. The injector 600 is electrically connected with the ECU 400, and injects fuel to the cylinder according to a command signal from the ECU 400. Specifically, the injector 600 includes a needle which is cylindrical-shaped and can close an injection hole formed in a distal end portion of the injector 600. When the injector 600 is attached to the cylinder, the distal end portion of the injector 600 is closer to the cylinder than a base end portion of the injector 600. The needle opens or closes the injection hole to inject the fuel to the cylinder, when moving reciprocally in an axial direction of the injector 600 after receiving the command signal from the ECU 400. The injector 600 is connected to the fuel tank 100 via the main return pipe 731. The fuel which is supplied from the common rail 500 and is not injected to the cylinder is returned to the fuel tank 100 via the main return pipe 731 as the main return fuel.

The common rail 500 is cylindrical-shaped and includes a hollow. The common rail 500 is connected to the supply pump 300 via the high-pressure pipe 720. The common rail 500 stores the fuel supplied from the supply pump 300 via the high-pressure pipe 720, and supplies the fuel to the injector 600. The common rail 500 includes a pressure sensor 510 and a pressure limiter 520. The pressure sensor 510 detects the fuel pressure in the common rail 500, and transmits a detected pressure to the ECU 400. The pressure limiter 520 is connected to the fuel tank 100 via the main return pipe 731. The pressure limiter 520 includes a valve portion provided with an elastic body. The valve portion of the pressure limiter 520 is usually closed according to a biasing force generated by an elastic force of the elastic body. When the fuel pressure in the common rail 500 becomes greater than or equal to the biasing force of the elastic body, the valve portion of the pressure limiter 520 is opened according to a deformation of the elastic body. Therefore, the common rail 500 and the fuel tank 100 are connected to each other via the main return pipe 731 which is connected to the pressure limiter 520. The pressure limiter 520 reduces the fuel pressure in the common rail 500 by discharging the fuel from the common rail 500 to the fuel tank 100, thereby preventing the fuel pressure in the common rail 500 from becoming greater than or equal to a specified pressure.

The ECU 400 includes a central processing unit (CPU) 410 which executes various calculations, and a memory 420 which stores data for calculating, calculating results, and programs. The ECU 400 is electrically connected with the injector 600, the supply pump 300, the clogging switch portion 210, the pressure sensor 510, the residual-fuel meter 110, and the outer temperature sensor 800. The ECU 400 computes a command value (command signal) of a fuel amount drawn and discharged by the supply pump 300, by executing a calculation using the CPU 410 after receiving the detected pressure from the pressure sensor 510. The ECU 400 controls the fuel amount discharged to the common rail 500 and a fuel injection pressure of the injector 600, by outputting the command value to the supply pump 300. The ECU 400 controls a fuel injection amount that is actually injected by the injector 600, by outputting a command value of the fuel injection amount to the injector 600. The ECU 400 determines that the fuel filter 200 is clogged, by receiving the off signal from the clogging switch portion 210. The memory 420 stores a map predetermined by a pre-test and indicating a relationship between the residual-fuel quantity in the fuel tank 100, a cancel period for canceling a high-viscosity change of the fuel, and an ambient temperature. It is known that the viscosity of the fuel used in the internal combustion engine varies according to the fuel temperature. When the fuel temperature becomes lower, the viscosity of the fuel becomes higher. In this case, the high-viscosity change of the fuel is generated. The high-viscosity change of the fuel is a change of the viscosity of the fuel from a low viscosity to a high viscosity. The ECU 400 sets a non-detection period TL corresponding to a prohibit period where a clogging detection of the fuel filter 200 is prohibited, based on the map, after the ECU 400 acquires the residual-fuel quantity Fq from the residual-fuel meter 110, the ambient temperature At from the outer temperature sensor 800. The ECU 400 corresponds to a period setting portion.

The ECU 400 executes a count by adding a count value a to a timer counter Tc which is a variable sequentially stored in the memory 420, after a start of the internal combustion engine. The count value a may be a first count value a1 or a second count value a2. The count is executed based on a specified vehicle-state value of the internal combustion engine. The specified vehicle-state value is a value indicating a vehicle state. The specified vehicle-state value is predetermined and correlates to an increase in fuel temperature. Specifically, when the specified vehicle-state value is less than a threshold, the ECU 400 determines that the internal combustion engine operates in a first state, and executes the count by adding the first count value a1 to the timer counter Tc. When the specified vehicle-state value is greater than or equal to the threshold, the ECU 400 determines that the internal combustion engine operates in a second state, and executes the count by adding the second count value a2 to the timer counter Tc. In this case, the second count value a2 corresponds to the first count value a1 after being corrected. Since the timer counter Tc is integrated at a predetermined interval, the ECU 400 can measure time, and the ECU 400 corresponds to a timer count portion. In addition, the second count value a2 is set to a value greater than the first count value a1.

The outer temperature sensor 800 corresponding to a temperature sensor measuring the ambient temperature At of an exterior of a vehicle is provided in an inlet portion where air is suctioned from outside to control an indoor temperature. The outer temperature sensor 800 sends the ambient temperature At to the ECU 400 after measuring the ambient temperature At. The outer temperature sensor 800 corresponds to an ambient-temperature detection portion.

Figure 2:
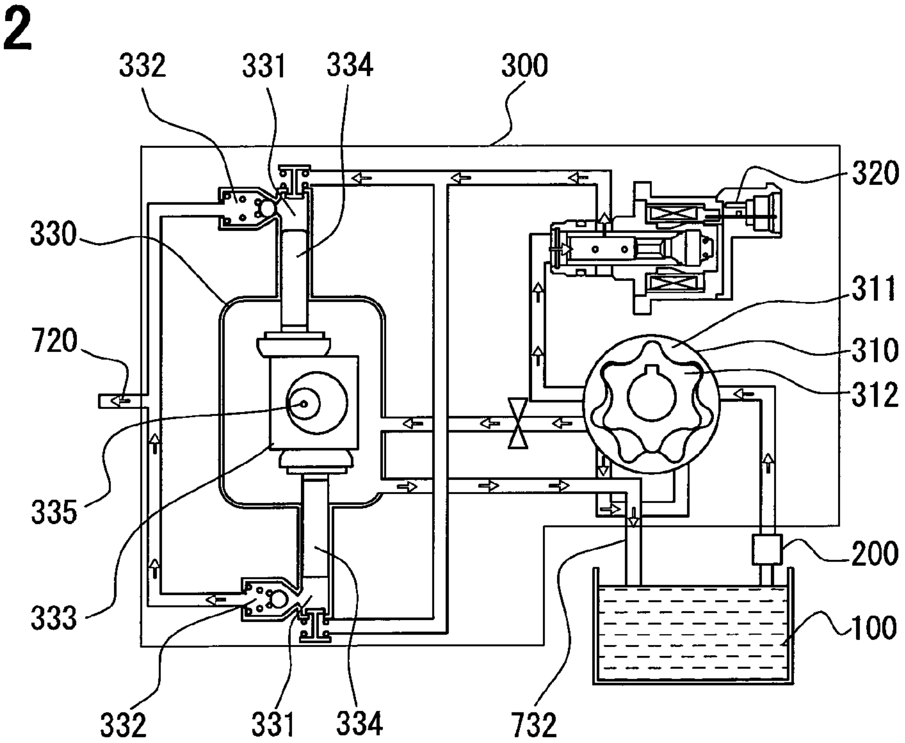
FIG. 2 is a diagram showing a supply pump according to the embodiment.

The supply pump 300 supplies the fuel to the internal combustion engine, by drawing the fuel from the fuel tank 100 and discharging the fuel to the common rail 500. As shown in FIG. 2, the supply pump 300 includes a feed pump 310, a fuel regulator 320, and a high-pressure pump 330. The feed pump 310 corresponding to a low-pressure pump may be a trochoid pump. Since a space formed by both an outer roller 311 and an inner roller 312 is changed according to a rotation of a rotor, the fuel is drawn from the fuel tank 100 and is supplied to the high-pressure pump 330. The fuel regulator 320 is provided in a passage between the feed pump 310 and the high-pressure pump 330. The fuel regulator 320 is an electronic valve connected to the ECU 400. The fuel regulator 320 controls an amount of the fuel supplied to the high-pressure pump 330 by receiving a command from the ECU 400. Since the fuel regulator 320 controls the amount of the fuel compressed in the high-pressure pump 330, a pressure of the fuel supplied from the high-pressure pump 330 to the common rail 500 can be controlled. The high-pressure pump 330 includes a pump chamber 331 in which the fuel is compressed, a check valve 332 provided at an outlet portion of the pump chamber 331, a cam ring 333 including a space for a cam shaft 335 to rotate, and a plunger 334 receiving a power from the cam ring 333 to move reciprocally. The fuel supplied to the pump chamber 331 is compressed to a high-pressure fuel according to a reciprocal movement of the plunger 334 in the pump chamber 331. The fuel that is compressed is discharged to the common rail 500 via the check valve 332. The check valve 332 is a mechanical valve member provided to prevent the fuel discharged to the common rail 500 from flowing backward to the high-pressure pump 330.

A part of the fuel supplied to the feed pump 310 is supplied to the plunger 334 and the cam ring 333 as a lubricant of the high-pressure pump 330. The fuel used as the lubricant is returned to the fuel tank 100 via the pump return pipe 732 after lubricating the plunger 334 or the cam ring 333.

Figure 3:
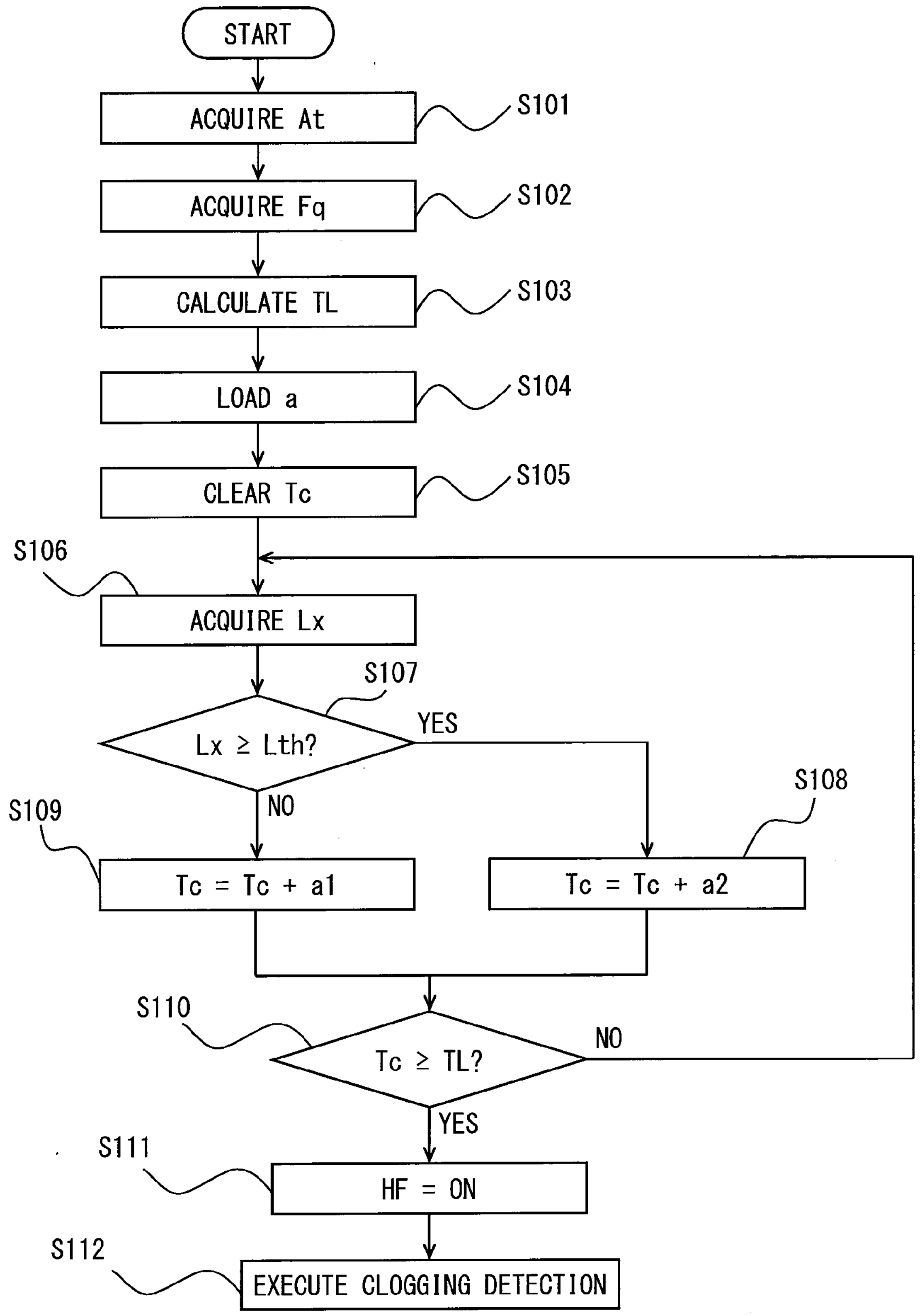
FIG. 3 is a flowchart showing a clogging detection flow according to the embodiment.

Next, as shown in FIG. 3, a flowchart indicating a flow before the ECU 400 starts the clogging detection will be described. The present flow is started in a case where a warm-up complete flag HF is set to off after the start of the internal combustion engine. The warm-up complete flag HF is set for determining whether the high-viscosity change of the fuel is canceled. For example, when the warm-up complete flag HF is set to on, the high-viscosity change of the fuel is canceled. In addition, when the internal combustion engine is stopped, the warm-up complete flag HF is set to off.

At S101, the ECU 400 acquires the ambient temperature At from the outer temperature sensor 800. At S102, the ECU 400 acquires the residual-fuel quantity Fq from the residual-fuel meter 110. Then, the ECU 400 proceeds to S103.

At S103, the ECU 400 sets the non-detection period TL based on the ambient temperature At and the residual-fuel quantity Fq. Specifically, the ECU 400 loads the map stored in the memory 420, and inputs the ambient temperature At and the residual-fuel quantity Fq into the map. The map is predetermined by a pre-test and indicates a relationship between the residual-fuel quantity Fq, a reaching period for the fuel temperature to reach a predetermined temperature, and the ambient temperature At. Therefore, the ECU 400 sets the reaching period as the non-detection period TL. In addition, the map indicates a relationship between the ambient temperature At, the residual-fuel quantity Fq, and a period, in the first state where a fuel return amount Lx is less than the threshold Lth. In this case, the period always includes the cancel period for canceling the high-viscosity change of the fuel in the fuel filter 200. The ECU 400 calculates the non-detection period TL by inputting the ambient temperature At and the residual-fuel quantity Fq to the map. According to the present embodiment, an operation in S103 corresponds to the period setting portion. Then, the ECU 400 proceeds to S104.

At S104, the ECU 400 loads the count value a stored in the memory 420. The count value a includes the first count value a1 and the second count value a2. The second count value a2 is added to the timer counter Tc, in the second state where the fuel return amount Lx is greater than the threshold Lth. The first count value a1 is added to the timer counter Tc, in the first state where the fuel return amount Lx is less than or equal to the threshold Lth. In addition, the second count value a2 is set to a value greater than the first count value a1. The ECU 400 calculates an increasing rate of the fuel temperature according to the fuel return amount Lx returned from the internal combustion engine to the fuel tank 100, uses the fuel return amount Lx as the specified vehicle-state value, and sets the threshold Lth. Since the second state is a state where the fuel return amount Lx is greater than the threshold Lth, a count speed of the timer counter Tc can indicate an increasing rate of the fuel temperature in the second state.

Since the return fuel returned to the fuel tank 100 from the internal combustion engine is increased according to heat transmitted to the return fuel from a combustion in the internal combustion engine, the fuel temperature in the fuel tank 100 is increased. Therefore, the fuel return amount Lx correlates to an increase in fuel temperature in the fuel tank 100. According to the present embodiment, the fuel return amount Lx includes the main return amount returned from the common rail 500 and the injector 600, and the pump return amount returned from the high-pressure pump 330. Since the fuel flowing into the pump chamber 331 via a space of the plunger 334 is compressed in the pump chamber 331 to have a high fuel temperature, and the fuel temperature of the return fuel from the high-pressure pump 330 is increased. The fuel temperature in the fuel tank 100 is increased by the pump return fuel from the high-pressure pump 330. Since the fuel return amount Lx correlating to the increase in fuel temperature is used as the specified vehicle-state value, the count speed of the timer counter Tc can indicate the increasing rate of the fuel temperature.

Then, at S105, the ECU 400 clears the timer counter Tc stored in the memory 420. That is, when the count is started in the non-detection period TL, the ECU 400 initializes the timer counter Tc.

At S106, the ECU 400 acquires the fuel return amount Lx. The fuel return amount Lx may be the injection amount subtracted from the fuel amount. In this case, the injection amount is an amount of the fuel injected by the injector 600 to the cylinder, and the fuel amount is an amount of the fuel drawn by the supply pump 300. Alternatively, the fuel return amount Lx may be directly detected by a sensor provided in the return pipe 730.

At S107, the ECU 400 determines whether the fuel return amount Lx is greater than or equal to the threshold Lth. When the ECU 400 determines that the fuel return amount Lx is greater than or equal to the threshold Lth, the ECU 400 proceeds to S108. At S108, the ECU 400 adds the second count value a2 to the timer counter Tc. According to the present embodiment, an operation in S108 corresponds to the timer count portion. When the ECU 400 determines that the fuel return amount Lx is less than the threshold Lth at S107, the ECU 400 proceeds to S109. At S109, the ECU 400 adds the first count value a1 to the timer counter Tc. According to the present embodiment, an operation in S109 corresponds to the timer count portion.

The ECU 400 proceeds to S110, after adding the first count value a1 or the second count value a2 to the timer counter Tc. At S110, the ECU 400 determines whether the timer counter Tc is greater than or equal to the non-detection period TL. When the ECU 400 determines that the timer counter Tc is less than the non-detection period TL, the ECU 400 determines that the fuel temperature has not reached a cancel temperature where the high-viscosity change of the fuel is canceled. Then, the ECU 400 returns to S106, and reexecutes an adding operation to add the count value a to the timer counter Tc. When the ECU 400 determines that the timer counter Tc is greater than or equal to the non-detection period TL, the ECU 400 proceeds to S111.

At S111, the ECU 400 determines that the fuel temperature is increased to the cancel temperature, and turns on the warm-up complete flag HF. Then, the ECU 400 proceeds to S112.

At S112, the ECU 400 executes the clogging detection of the fuel filter 200 by the clogging switch portion 210 provided in the fuel filter 200. When the fuel filter 200 is clogged, the clogging switch portion 210 provided at the outlet portion of the fuel filter 200 operates according to a decrease in fuel pressure between the supply pump 300 and the fuel filter 200, and sends the off signal to the ECU 400. When the ECU 400 determines that the off signal continues for a specified period, the ECU 400 turns on a temporary determination switch. Further, when the ECU 400 determines that the temporary determination switch continues to be turned on for a specified period or the temporary determination switch has been turned on for a specified number of times, the ECU 400 determines that the fuel filter 200 is clogged.

In addition, a time period for executing S106, S107, S108 and S110 is the same as a time period for executing S106, S107, S109, and S110.

Figure 5:
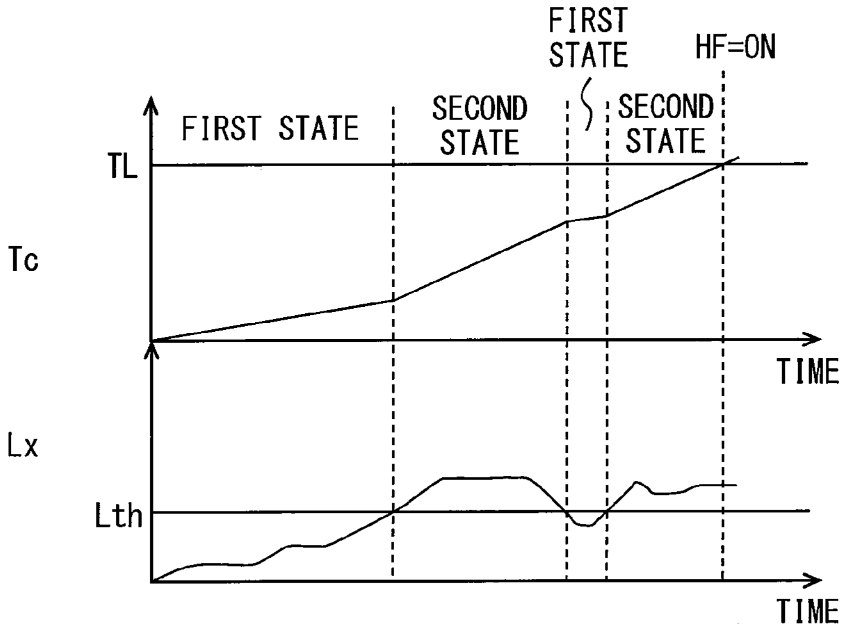
FIG. 5 is a graph showing a relationship between a timer counter, a fuel return amount, and time, according to the embodiment.

As the above description, the non-detection period TL is set, and the count is executed until the timer counter Tc exceeds the non-detection period TL as shown in FIG. 5. As shown in FIG. 5, when the fuel return amount Lx is less than the threshold Lth, the timer counter Tc is increased by adding the first count value a1 to the timer counter Tc. When the fuel return amount Lx is greater than or equal to the threshold Lth, the timer counter Tc is increased by adding the second count value a2 to the timer counter Tc. Since the second count value a2 of the second state is greater than the first count value a1 of the first state, the count speed of the timer counter Tc in the second state is greater than that in the first state.

Figure 4:
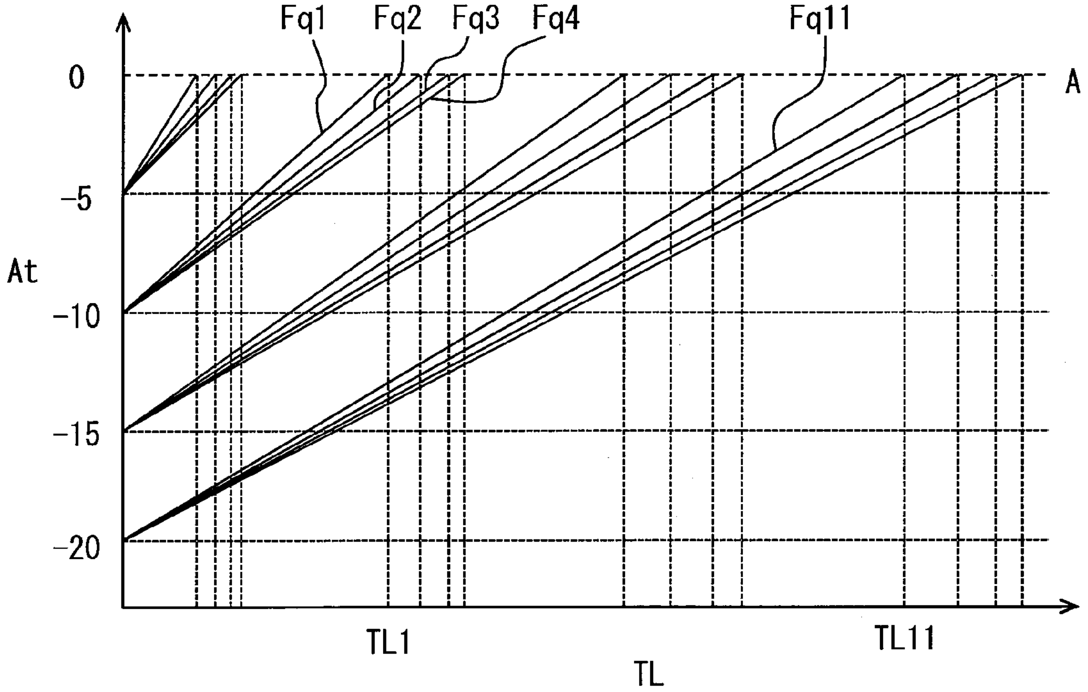
FIG. 4 is a graph showing a relationship between a fuel surplus amount, an ambient temperature, and a non-detection period.

Next, referring to FIG. 4, the map will be detailed. As shown in FIG. 4, the horizontal axis indicates the non-detection period TL, and the vertical axis indicates the ambient temperature At. A dashed line A indicates the cancel temperature in a fuel property. Further, the cancel temperature is determined according to a fuel composition. For example, the cancel temperature may a value set by a cold filter plugging point (CFPP) in the European and American standard. Alternatively, the cancel temperature may be determined by a test in which an actual temperature is detected in a case where the high-viscosity change of the fuel is canceled. According to the map, the non-detection period TL is set according to the residual-fuel quantity Fq. Even though the ambient temperatures At are the same, different non-detection periods TL can be set according to the residual-fuel quantities Fq.

Referring to FIG. 4, an example of setting the non-detection period TL will be described. When the ambient temperature At transmitted from the outer temperature sensor 800 to the ECU 400 is −10 degrees Celsius, the ECU 400 determines to use solid lines Fq1 to Fq4. The solid line Fq1 indicates that the residual-fuel quantity Fq is equal to a quarter of a maximum value of the residual-fuel quantity Fq. The solid line Fq2 indicates that the residual-fuel quantity Fq is equal to a half of the maximum value. The solid line Fq3 indicates that the residual-fuel quantity Fq is equal to three quarters of the maximum value. The solid line Fq4 indicates that the residual-fuel quantity Fq is equal to the maximum value. When the residual-fuel quantity Fq is equal to a quarter of the maximum value, the ECU 400 uses the solid line Fq1. The ECU 400 loads a point TL1 which is a cross point between the solid line Fq1 and the dashed line A. The ECU 400 sets the non-detection period TL to a value of the point TL1. As the above description, when the residual-fuel quantity Fq is equal to a quarter of the maximum in a case where the ambient temperature At is −20 degrees Celsius, the ECU 400 loads a point TL11 which is a cross point between the solid line Fq11 and the dashed line A, and sets the non-detection period TL to a value of the point TL11. The value of the point TL11 is greater than the value of the point TL1. The non-detection period TL is set to be increased in accordance with an increase in residual-fuel quantity Fq or in accordance with a decrease in ambient temperature At. The dashed line A is predetermined according to the fuel used in the vehicle, and may be set to other temperatures rather than zero degrees Celsius.

Hereafter, effects according to the present embodiment will be described. The fuel supplying controller 1 includes the outer temperature sensor 800 detecting the ambient temperature At of the vehicle, and the residual-fuel meter 110 detecting the residual-fuel quantity Fq in the fuel tank 100. The fuel supplying controller 1 sets the non-detection period TL based on the ambient temperature At detected by the outer temperature sensor 800 and the residual-fuel quantity Fq detected by the residual-fuel meter 110. The clogging detection is not executed during the non-detection period TL. According to the present embodiment, since the non-detection period TL is set based on the residual-fuel quantity Fq, the non-detection period TL can indicate the increasing rate of the fuel temperature varied according to the residual-fuel quantity Fq. Since the non-detection period TL is set based on the ambient temperature At, the non-detection period TL can indicate the cancel period varied according to an excess or deficiency of heat that is necessary to be transmitted to the fuel. Since the fuel supplying controller 1 can accurately set the non-detection period TL based on the ambient temperature At and the residual-fuel quantity Fq, it is accurately measured that the high-viscosity change of the fuel is canceled. Since the clogging detection is executed after the non-detection period TL has elapsed, an erroneous determination can be prevented. Therefore, a reliability of the clogging detection can be improved.

According to the present embodiment, the ECU 400 stores the reaching period for the fuel temperature to reach the predetermined temperature, with respect to the residual-fuel quantity Fq and the ambient temperature At. The ECU 400 sets the non-detection period TL to the reaching period. The reaching period also corresponds to the cancel period for the high-viscosity change of the fuel in the fuel filter 200 to be canceled. Since the map is stored in the ECU 400, the non-detection period TL can be readily calculated based on the ambient temperature At and the residual-fuel quantity Fq, without any complicated calculations. Since the cancel period for the high-viscosity change of the fuel to be canceled is determined by the map, the non-detection period TL can be set to a period for the high-viscosity change of the fuel to be necessarily canceled after the non-detection period TL has elapsed, without respect to the heat transmitted to the fuel by a combustion of the internal combustion engine after the non-detection period TL has elapsed. That is, the high-viscosity change of the fuel is necessarily canceled after the non-detection period TL has elapsed, without respect to any counting in the non-detection period TL. Since the high-viscosity change of the fuel is necessarily canceled after the non-detection period TL has elapsed, The reliability of the clogging detection can be improved.

According to the present embodiment, the ECU 400 measures a period for the timer counter Tc to exceed the non-detection period TL, by adding the count value a to the timer counter Tc which is a variable sequentially stored in the memory 420. The count value a added to the timer counter Tc in the first state where the specified vehicle-state value is less than the threshold Lth is different from the count value a added to the timer counter Tc in the second state where the specified vehicle-state value is greater than or equal to the threshold Lth. In the first state, the count is executed by using the first count value a1. In the second state where the increase in fuel temperature is greater than that in the first state, the count is executed by using the second count value a2 that is different from the first count value a1. Thus, in the non-detection period TL, the count can be executed by changing the count speed. The count in which the time counter Tc indicates the increasing rate of the fuel temperature can be executed, and the count can be executed according to the increasing rate of the fuel temperature during the non-detection period TL. It can be accurately measured that the high-viscosity change of the fuel is canceled, and the reliability of the clogging detection can be improved.

According to the present embodiment, the fuel return amount Lx which is returned to the fuel tank 100 from the internal combustion engine and the supply pump 300 is used as the specified vehicle-state value of the internal combustion engine. Since the return fuel returned is increased according to the heat transmitted to the return fuel according to the combustion of the internal combustion engine, the fuel temperature in the fuel tank 100 is increased. Since the fuel flowing into the pump chamber 331 via a space of the plunger 334 is compressed in the pump chamber 331 to have a high fuel temperature, and the fuel temperature of the return fuel from the supply pump 300 to the fuel tank 100 is increased. The increasing rate of the fuel temperature in the fuel tank 100 correlates to the fuel return amount Lx. According to the present embodiment, the fuel return amount Lx is used as the specified vehicle-state value, and the count value a is changed by the timer count portion determining whether the fuel return amount Lx exceeds the threshold Lth. Then, the increasing rate of the fuel temperature can be measured, and it can be accurately measured that the high-viscosity change of the fuel is canceled. Thus, the reliability of the clogging detection can be improved.

According to the present embodiment, the outer temperature sensor 800 detecting the ambient temperature At corresponds to a temperature sensor measuring a temperature of air flowing from an exterior of the vehicle to an interior of the vehicle. Since the ambient temperature At is used to measure the fuel temperature in a case where the non-detection period TL is set, the outer temperature sensor 800 may be provided at a position where the ambient temperature At varies along with time according to wind. Therefore, the fuel supplying controller 1 can be readily configured by using a temperature sensor which is generally used to control an inner temperature of the vehicle.

According to the present embodiment, the non-detection period TL is set based on the fuel property. The non-detection period TL can indicate the fuel property by a test, even though the fuel is changed under environments. Thus, the non-detection period TL can be accurately set, and the reliability of the clogging detection can be improved.

Other Embodiment

The present disclosure is not limited to the embodiments mentioned above, and can be applied to various embodiments within the spirit and scope of the present disclosure.

According to a first modification of the present disclosure, the specified vehicle-state value may be an amount correlating to the increase in fuel temperature, for example, an engine speed, an accelerator position, or a fuel injection pressure.

According to second modification of the present disclosure, the clogging detection portion may include an inlet detection portion and an outlet detection portion. The inlet detection portion is provided in an inlet portion of the fuel filter 200, and the outlet detection portion is provided in the outlet portion of the fuel filter 200. When a difference between a detected value of the inlet detection portion and a detected value of the outlet detection portion is less than or equal to a predetermined value, the clogging detection is executed.

According to a third modification of the present disclosure, the ambient-temperature detection portion may be a temperature sensor provided at a position where the ambient temperature does not vary according to wind. For example, the temperature sensor may be provided at a position inside of a front bumper of the vehicle.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A fuel supplying controller comprising:

a fuel tank accommodating a fuel;

a supply pump supplying the fuel from the fuel tank to an internal combustion engine of a vehicle;

a fuel filter provided in a passage between the fuel tank and the supply pump, the fuel filter filtering the fuel;

a clogging detection portion detecting a clogging of the fuel filter;

a period setting portion setting a non-detection period where a clogging detection according to the clogging detection portion is prohibited;

a timer count portion measuring a period from a start of the internal combustion engine to a time point that a timer counter exceeds the non-detection period;

an ambient-temperature detection portion detecting an ambient temperature of an exterior of the vehicle; and a residual-fuel detection portion detecting a residual-fuel quantity in the fuel tank, wherein the period setting portion sets the non-detection period, based on the ambient temperature detected by the ambient-temperature detection portion and the residual-fuel quantity detected by the residual-fuel detection portion.

2. The fuel supplying controller according to claim 1, wherein the period setting portion stores a reaching period for the fuel temperature to reach a predetermined temperature, with respect to the residual-fuel quantity and the ambient temperature, the period setting portion sets the reaching period as the non-detection period, and the reaching period corresponds to a cancel period for a high-viscosity change of the fuel in the fuel filter to be canceled.

3. The fuel supplying controller according to claim 1, wherein the timer count portion measures a period for a timer counter to exceed the non-detection period, by adding a count value to the timer counter which is a variable sequentially stored in a memory of the time count portion, and the count value added to the timer counter in a first state where a specified vehicle-state value correlating to an increase in fuel temperature is less than a threshold is different from the count value added to the timer counter in a second state where the specified vehicle-state value is greater than or equal to the threshold.

4. The fuel supplying controller according to claim 3, wherein the specified vehicle-state value is a fuel return amount returned to the fuel tank from the internal combustion engine and the supply pump.

5. The fuel supplying controller according to claim 1, wherein the ambient-temperature detection portion is a temperature sensor measuring a temperature of air flowing from the exterior of the vehicle to an interior of the vehicle.

6. The fuel supplying controller according to claim 1, wherein the non-detection period is set to be increased in accordance with an increase in residual-fuel quantity and in accordance with a decrease in ambient temperature.

* * * * *